United States Patent [19]
Hsiao et al.

[11] Patent Number: 5,833,326
[45] Date of Patent: Nov. 10, 1998

[54] MULTIPLE MASTER CYLINDER BRAKING SYSTEM

[76] Inventors: Rui-Yang Hsiao, No. 265, Sec. 3, Huanho S. Rd., Taipei; Ping-Hui Hsiao, No. 71-1, An Hsi Li, Chia Li Chen, Tainan Hsien, both of Taiwan

[21] Appl. No.: 854,886

[22] Filed: May 12, 1997

[51] Int. Cl.$^6$ .................................................. B60T 8/02
[52] U.S. Cl. ........................................ 303/9.72; 188/345
[58] Field of Search .............................. 188/345; 303/10, 303/11, 9.72

[56] References Cited

U.S. PATENT DOCUMENTS

| | | | |
|---|---|---|---|
| 3,067,842 | 12/1962 | Smith | 188/345 |
| 3,422,622 | 1/1969 | Arentoft et al. | 188/345 |
| 3,979,153 | 9/1976 | Ingram et al. | 188/345 |
| 4,600,243 | 7/1986 | Belart et al. | 188/345 |

*Primary Examiner*—Matthew C. Graham
*Attorney, Agent, or Firm*—Bacon & Thomas

[57] ABSTRACT

A hydraulic brake system employing two hydraulic brake assemblies. The first hydraulic brake assembly includes a first master hydraulic cylinder in communication with two reservoirs for respectively actuating a pair of brakes for braking front wheels and another of brakes for braking rear wheels of a car. The second hydraulic brake assembly includes a second master hydraulic cylinder in communication with a further reservoir for simultaneously actuating the four brakes for braking the front and rear wheels.

3 Claims, 2 Drawing Sheets

MULTIPLE MASTER CYLINDER BRAKING SYSTEM

BACKGROUND OF INVENTION

1. Field of Invention

This invention relates to a hydraulic brake system, particularly to a hydraulic brake system which has an improved safety feature,

2. Related Prior Art

Vehicles are increasingly important for transportation in modern societies. Hydraulic brakes are commonly used by vehicles for safety, however, these brakes sometimes fail. The major reason for the failure of hydraulic brakes is the leakage of the hydraulic medium.

To solve the above-mentioned problem, a hydraulic brake system has previously been disclosed consisting of a first hydraulic brake assembly and a second hydraulic brake assembly. The first hydraulic brake assembly is actuatable by pressing a first pedal, and the second hydraulic brake assembly is actuatable by pressing a second pedal. When the first hydraulic brake assembly fails, the second pedal has to be pressed in order to actuate the second hydraulic brake assembly. However, it takes time to realize chat the first brake assembly has failed. It also takes time to move a driver's foot from the first pedal to the second pedal. It also takes further time to press the second pedal. During such a period of time, vehicles may have traveled beyond the desired stopping place thereby possibly causing an accident. That is, such an approach does not provide sufficient safety.

Furthermore, U.S. Pat. No. 4,586,590 discloses a vehicle brake system which comprises two master cylinders 30 and 32 for respectively controlling the braking of the front wheels and the rear wheels via two oil lines 42 and 44. When one of the oil lines 42, 44 leaks or one of the master cylinders 30 and 32 malfunctions, 50 percent of the original braking ability will be lost, which is dangerous when the driver must stop suddenly.

Moreover, U.S. Pat. No. 3,067,842 discloses a braking system which comprises two major cylinders 64 for respectively braking all four wheels of the car via two oil lines 118. Such a braking system will also lose 50 percent of its original braking ability when one of the oil lines 118 leaks or one of the major cylinders 64 malfunctions Therefore, this invention is intended to solve the above-mentioned problems.

SUMMARY OF INVENTION

It is an object of this invention to provide a hydraulic brake system employing two hydraulic brake assemblies. The first hydraulic brake assembly includes a first master hydraulic cylinder in communication with a first and a second reservoir for respectively actuating a pair of first brakes for front wheels and a pair of second brakes for rear wheels respectively via a first and a second oil line. The second hydraulic brake assembly includes a second master hydraulic cylinder in communication with a third reservoir for simultaneously driving the four brakes of the front and rear wheels via a third oil line. The first master hydraulic cylinder has a first mandrel extending therefrom. The second master hydraulic cylinder has a second mandrel extending therefrom. A pedal links to a first rod extending from a pump from which a second rod also extends. The second rod links to the first and second mandrels. Thus, the first and second hydraulic brake assemblies are simultaneously actuated when the pedal Is pressed. In the case that the first reservoir of the first hydraulic brake assembly fails or the first oil line leaks, the hydraulic brake system in accordance with the present invention can still have the braking ability equal to that available from the braking systems used in present cars. Similarly, if the second reservoir fails or the second oil line leaks, the hydraulic brake system in accordance with the present invention also can still have the braking ability equal to that available from the braking systems used in present cars. Finally, if the third reservoir fails or the third oil line leaks, the present invention still has a hydraulic brake assembly which can independently brake the front and rear wheels; such a brake assembly is safer than a brake assembly which simultaneously brakes the four wheels of a car.

When braking, due to the car being either of the front wheel drive or rear wheel drive type, wheels are subjected to unbalanced forces, and the brake linings wear unevenly. The present invention discloses to add an additional braking assembly which simultaneously brakes the four wheels, in addition to the normal braking assembly, which independently brakes the front wheels and the rear wheels. The design of the present invention can improve the balance of the braking of the front and rear wheels to avoid the uneven wearing of the brake linings and improper slippage of the wheels during braking.

Furthermore, the present invention has two braking assemblies which are simultaneously activated by pressing a brake pedal to control two pumps which in turn control eight minor pumps via three oil lines to drive eight brake linings. Thus, the present invention can generate a double braking force by pressing one brake pedal when the car is moving, whereby the distance needed to stop the moving car can be shortened, the wear degree of the linings can be reduced, the life of the brake linings can be extended and the safety of the car can be improved.

Finally, the present invention is related to two braking assemblies which are independent from each other and are simultaneously activated. Thus, if one braking assembly malfunctions when the car is being moved, the other assembly can function to brake the moving car so that the safety of the passengers will be ensured.

For a better understanding of this invention and objects thereof, a study of the detailed description of the embodiments described hereinafter should be made in relation to the accompanying drawings.

DETAILED DESCRIPTION OF PREFERRED EMBODIMENT

This invention will be described in detail with reference to the drawings showing the preferred embodiment thereof.

Figure 1:
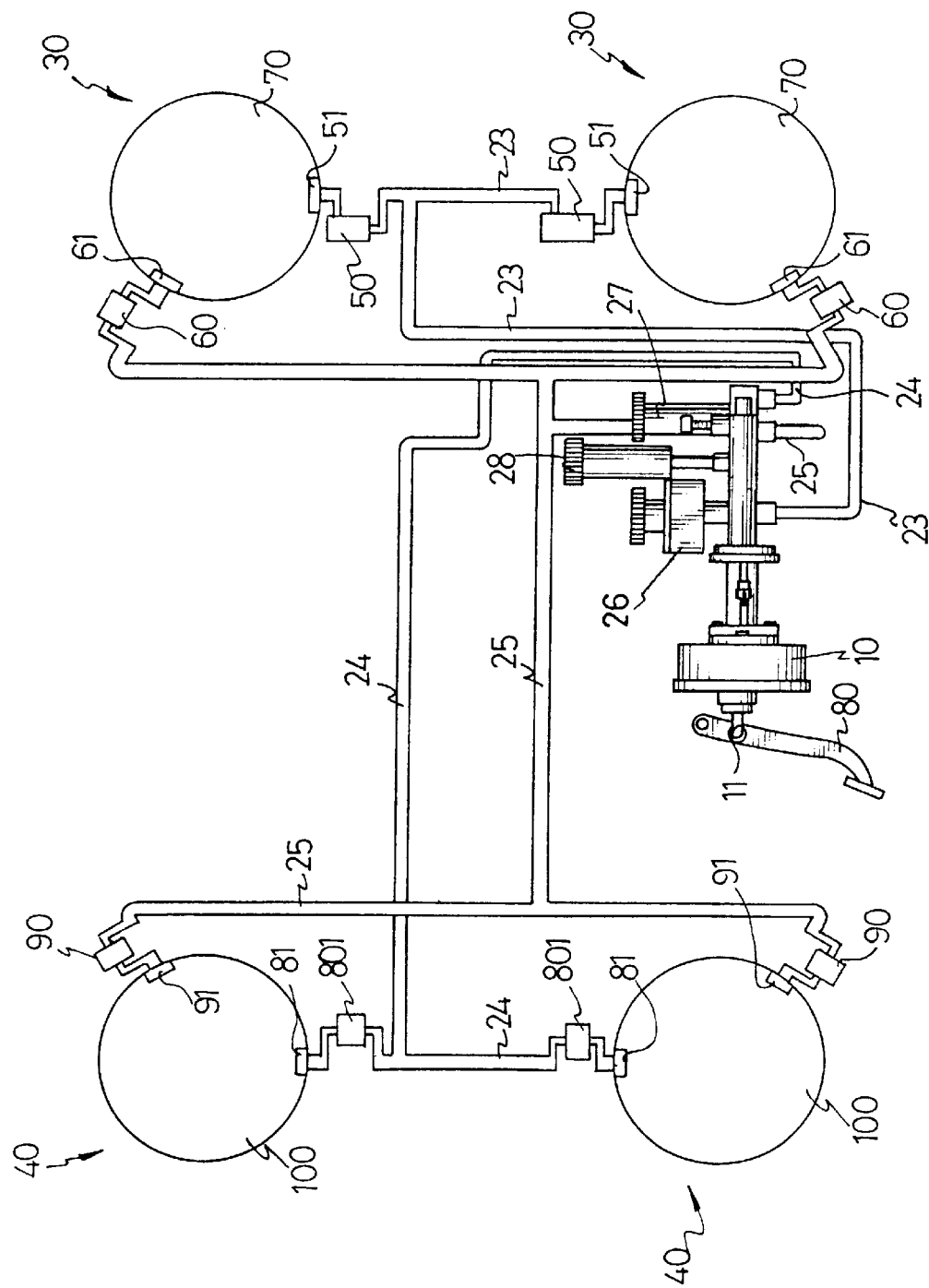
FIG. 1 is a schematic view of a hydraulic brake system in accordance with the preferred embodiment of this invention.
Figure 2:
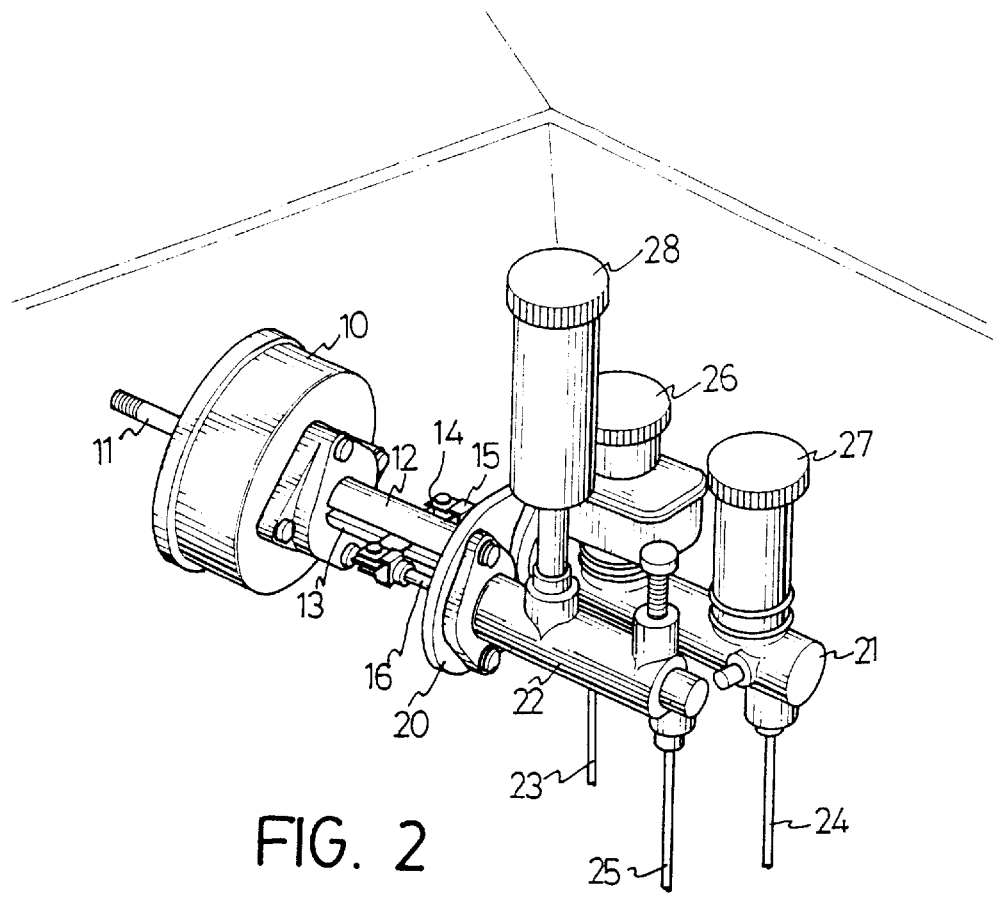
FIG. 2 is a perspective view of a driving device used in a hydraulic brake system in accordance with the preferred embodiment of this invention.

Referring to FIGS. 1 and 2, a hydraulic brake system has a pedal 80 pivotally mounted in a car (not shown) for actuating the hydraulic brake system when pressed.

A pump 10 having a first rod 11 and a second rod (not shown) extending in opposite directions therefrom is used for increasing hydraulic pressure for braking. Being conventional, details of the pump 10 will not be given. The pump 10 is firmly mounted in the car while the first rod 11 and the second rod are permitted to slide relative thereto. The first rod 11 operatively links to the pedal 80 so that the first rod 11 is pushed into the pump 10 when the pedal 80 is pressed. As the first rod 11 is pushed into the pump 10, the second rod is pushed out of the pump 10.

The second rod is sited between two guides 12 and 13. The guides 12 and 13 connect the pump 10 with a plate 20. A tip of the second rod connects with a middle point of a bar 14. The guides 12 and 13 ensure that the second rod and the bar 14 slide without rotating.

The bar 14 has a first end linking to a first mandrel 15 extending from a first master hydraulic cylinder 21 and a second end linking to a second mandrel 16 extending from a second master hydraulic cylinder 22, The plate 20 defines two holes through which the first mandrel 15 and the second mandrel 16 respectively extend. The first master hydraulic cylinder 21 and the second master hydraulic cylinder 22 are firmly mounted on the plate 20. The first master hydraulic cylinder 21 communicates a first reservoir 26 and a second reservoir 27 respectively with a first pipe 23 and a second pipe 24. The first pipe 23 leads to a pair of first brakes 30 for two front wheels (not shown) and the second pipe 24 loads to a pair of second brakes 40 for two rear wheels (not shown). The second master hydraulic cylinder 22 communicates a third reservoir 28 with a third pipe 25 leading to the first two brakes 30 for the front wheels (not shown) and the second two brakes 40 for the rear wheels (not shown).

Figure 3:
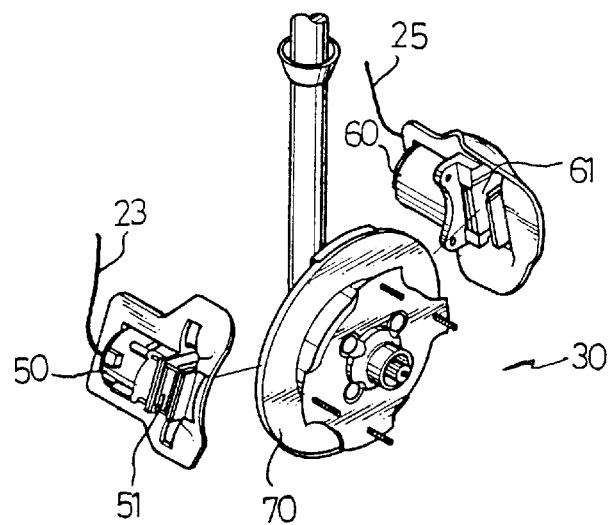
FIG. 3 is a perspective view of a brake incorporated in a hydraulic brake system in accordance with the preferred embodiment of this invention.

Generally, the brakes 30 are disk brakes, and the brakes 40 are drum brakes However, the brakes 30 and 40 can both be disk brakes or drum brakes Also referring to FIG. 3, each of the brakes 30 has a first minor hydraulic cylinder 50 communicating with the first pipe 23. The first minor hydraulic cylinder 50 can actuate a lining 51 for engaging with a disk 70.

Each of the brakes 30 also has a second minor hydraulic cylinder 60 communicating with the third pipe 25. The second minor hydraulic cylinder 60 can actuate a lining 61 for engaging with the disk 70 firmly linking to the corresponding front wheel.

Each of the brakes 40 has a third minor hydraulic cylinder 801 communicating with the second pipe 24. The third minor hydraulic cylinder 801 can actuate a lining 81 for engaging with a disk 100.

Each of the brakes 40 also has one fourth minor hydraulic cylinder 90 communicating with the third pipe 25. The fourth minor hydraulic cylinder 90 can actuate a lining 91 for engaging with the disk 100 firmly linking to the corresponding rear wheel.

From the above disclosures, it can be understood that the brake system in accordance with the present invention has a first brake assembly having two oil lines 23, 24 for respectively actuating two minor hydraulic cylinders for driving two linings to engage with the disks for front wheels and two linings to engage with the disks for rear wheels and a second brake assembly having an oil line 25 for simultaneously actuating four minor hydraulic cylinders for driving four linings to engage with the disks for the front and rear wheels.

As stated above, the hydraulic brake system according to the preferred embodiment of the present invention employs two hydraulic brake assemblies. The first hydraulic brake assembly includes the first master hydraulic cylinder 21, the first reservoir 26, the second reservoir 27, the first pipe 23, the second pipe 24, the front brakes 30 and the rear brakes 40. The second hydraulic brake assembly includes the second master hydraulic cylinder 22, the third reservoir 28, the third pipe 25, the front brakes 30 and the rear brakes 40. In the case that the first reservoir 26 of the first hydraulic brake assembly fails or the first pipe 23 leaks, the hydraulic brake system in accordance with the present invention can still have the braking ability equal to that available from the braking systems used in present cars. Similarly, if the second reservoir 27 fails or the second pipe 24 leaks, the hydraulic brake system in accordance with the present invention also can still have the braking ability equal to that available from the braking systems used in present cars. Finally, if the third reservoir 28 fails or the third pipe 25 leaks, the present invention still has a braking assembly which can independently brake the front and rear wheels wherein such a system is safer than a brake system which simultaneously brakes the four wheels. Thus, the hydraulic brake system in accordance with the present invention provides more security than conventional hydraulic brake systems.

While this invention has been explained in relation to its preferred embodiment, it is to be understood that variations thereof will be apparent to those skilled in the art upon reading this specification Therefore, this invention is intended to cover all such variations as shall fall within the scope of the appended claims.

I claim:

1. A hydraulic brake system for a motor vehicles having a pair of front wheels and a pair of rear wheels, comprising:

a pump comprising a first rod and a second rod extending in opposite directions therefrom, said first rod operatively linking to a pedal pivotally mounted in a vehicle, said second rod operatively linking to a bar;

two guides connecting said pump with a plate, and sandwiching said second rod so that said first rod and said bar slide without rotating;

a first master hydraulic cylinder linking to said plate and comprising a first mandrel penetrating said plate and linking to said bar, said first master hydraulic cylinder being in communication with a first reservoir and a second reservoir, said first reservoir driving a first pair of brakes for the front wheels via a first oil line, said second reservoir driving a second pair of brakes for the rear wheels via a second oil line; and a second master hydraulic cylinder linking to said plate and comprising a second mandrel penetrating said plate and linking to said bar, said second master hydraulic cylinder being in communication with a third reservoir said third reservoir driving the first and second pairs of brakes via a third oil line.

2. The hydraulic brake system in accordance with claim 1, wherein each of the first pair of brakes comprises a first disk, a first lining connected to the first oil line and drivable thereby to engage with the first disk, and a second lining connected to the third oil line and drivable thereby to engage with the first disk, and wherein each of the second pair of brakes comprises a second disk, a third lining connected with the second oil line and drivable thereby to engage with the second disk, and a fourth lining connected with the third oil line and drivable thereby to engage with the second disk.

3. The hydraulic brake system in accordance with claim 2, wherein the brakes comprise a plurality of minor pumps, and wherein each of the first linings is drivable by the first oil line via a first minor pump, each of the second linings is drivable by the third oil line via a second minor pump, each of the third linings is drivable by the second oil line via a third minor pump and each of the fourth linings is drivable by the third oil line via a fourth minor pump.

* * * * *